(12) United States Patent
Webb

(10) Patent No.: US 10,634,178 B2
(45) Date of Patent: Apr. 28, 2020

(54) APPARATUS FOR RETRACTABLE, TOOL-LESS CONNECTOR

(71) Applicant: Timothy Harold Webb, Hermosa Beach, CA (US)

(72) Inventor: Timothy Harold Webb, Hermosa Beach, CA (US)

(*) Notice: Subject to any disclaimer, the term of this patent is extended or adjusted under 35 U.S.C. 154(b) by 317 days.

(21) Appl. No.: 15/426,016

(22) Filed: Feb. 6, 2017

(65) Prior Publication Data

US 2018/0223887 A1 Aug. 9, 2018

(51) Int. Cl.
*F16B 12/12* (2006.01)
*F16B 12/20* (2006.01)

(52) U.S. Cl.
CPC ........ *F16B 12/125* (2013.01); *A47B 2230/09* (2013.01); *F16B 2012/2018* (2013.01)

(58) Field of Classification Search
CPC ............ F16B 12/2009; F16B 12/20027; F16B 12/2036; F16B 12/2018; F16B 12/2045; F16B 12/2072; F16B 12/125; F16B 12/24; F16B 12/26; F16B 2012/2018; E04B 2001/196; E04B 2001/1924; E04B 2001/1927; E04B 1/1903; Y10T 403/342; Y10T 403/347; Y10T 403/604
See application file for complete search history.

(56) References Cited

U.S. PATENT DOCUMENTS

| | | | | |
|---|---|---|---|---|
| 6,540,461 | B1 * | 4/2003 | Hawang | F16B 21/02 411/41 |
| 7,273,240 | B2 * | 9/2007 | Migli | E05C 19/022 292/251.5 |
| 7,585,126 | B2 * | 9/2009 | Ling | F16B 19/109 403/109.3 |
| 9,410,367 | B2 * | 8/2016 | Coker | E06B 9/323 |
| 9,458,874 | B2 * | 10/2016 | Sim | E04B 1/5831 |
| 10,060,159 | B2 * | 8/2018 | Fujii | E05B 65/006 |
| 2016/0325928 | A1 * | 11/2016 | Lepek | B65G 63/004 |

FOREIGN PATENT DOCUMENTS

EP 0557235 A1 * 8/1993 ........... E04B 1/1906

* cited by examiner

*Primary Examiner* — Joshua T Kennedy
(74) *Attorney, Agent, or Firm* — Stadler IP Law PLLC

(57) ABSTRACT

An arrangement for a tool-less locking connector to secure relative motion between two or more structural elements. The connector comprises a user interface that can be toggled between at least two positions including a retracted and an engaged position. The interface may be a button, thumb wheel, slider, twist knob, or any other structure that can be manipulated without the use of tools. The connector will also have a locking element which is controlled by the user interface. There will be at least two structural elements that this connector will be used to lock together. One of these structural elements will have a male fitting and another will have a female fitting. When the locking element of the connector is toggled to the retracted position, the structural element with the male fitting can move independently from the structural element with the female fitting.

9 Claims, 25 Drawing Sheets

APPARATUS FOR RETRACTABLE, TOOL-LESS CONNECTOR

CROSS-REFERENCE TO RELATED APPLICATIONS

This application claims the benefit of Provisional Application No. 62/389,523, filed on Mar. 1, 2016.

BACKGROUND TO THE INVENTION

1. Field of the Invention

The present invention relates to the assembly of furniture sections quickly and without the use of tools.

2. Description of the Prior Art

There is a need to provide a customer with a means of assembling/disassembling mating structural elements, such as furniture, quickly, easily and without the use of tools.

Current techniques for connecting structural elements without the use of tools; is done by friction and/or gravity.

What is thus desired is to provide a method for assembling/disassembling structural elements without utilizing tools and which provides a secure connection between structural elements which can be easily disassembled.

SUMMARY OF THE INVENTION

The present invention provides at least two structural elements in which there is at least one male and at least one female fitting built into the structural elements. This interface is similar to a traditional mortise and tenon joint. Within the female piece (corresponding to the structural element with the mortise), a cavity is formed on a surface adjacent to the mortise approximately 90° from the mortise. The connector is assembled and secured within this cavity using an adhesive. For example, this cavity could be a counterbored hole. In this example, the minor diameter of the counterbored hole goes down deep enough so that it extends into the volume of the mortise, but the major diameter does not extend into the mortise.

The mating tenon has a hole drilled through it which would be a similar diameter to the minor diameter of the counterbored hole extending into the mortise. When the tenon is fully engaged with the mortise, these two holes (the minor diameter cavity hole and the only hole in the tenon) are coaxial and of a similar size.

This arrangement enables a connector to be inserted into the cavity. Then without the need for tools, the user interface of this connector can be toggled between an engaged position and a retracted position. A locking element within the connector is engaged with the tenon when the user interface is in the engaged position. The locking element is withdrawn from the tenon when the connector is toggled to the retracted position. All structural elements are locked in place and when the user interface is in the retracted position, the structural elements move independently of each other.

BRIEF DESCRIPTION OF THE DRAWINGS

For a better understanding of the present invention as well as other objects and further features thereof, reference is made to the following description which is to be read in conjunction with the accompanying drawing therein.

DETAILED DESCRIPTION OF THE INVENTION

Figure 16:
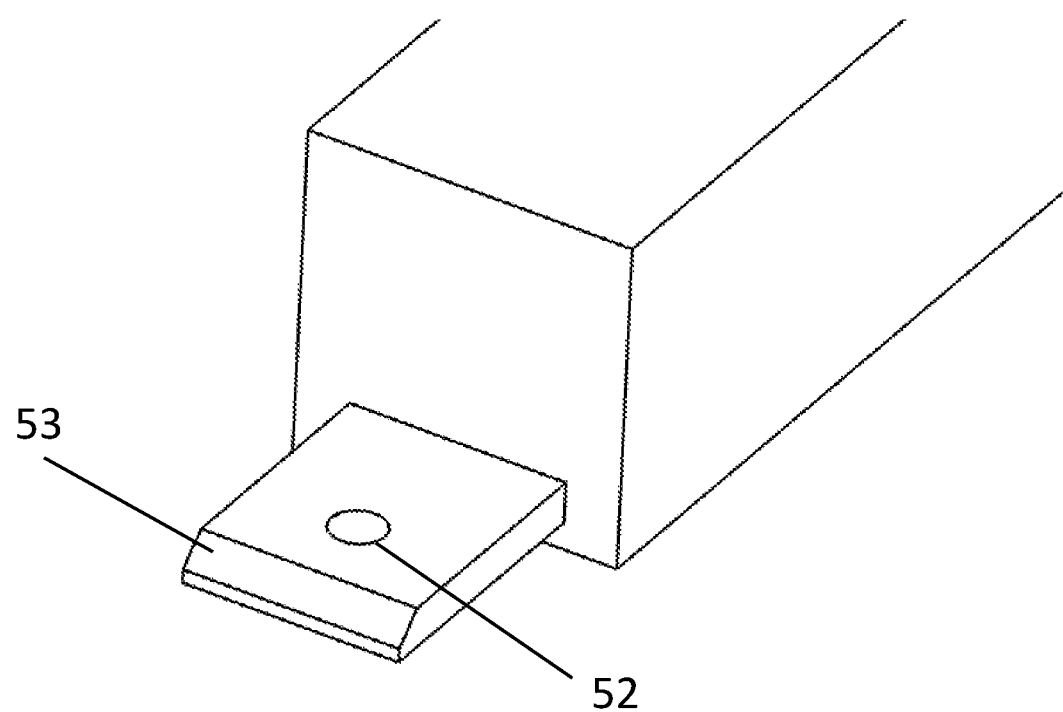
FIG. 16 is a perspective view of a structural element with a male fitting.
Figure 25:
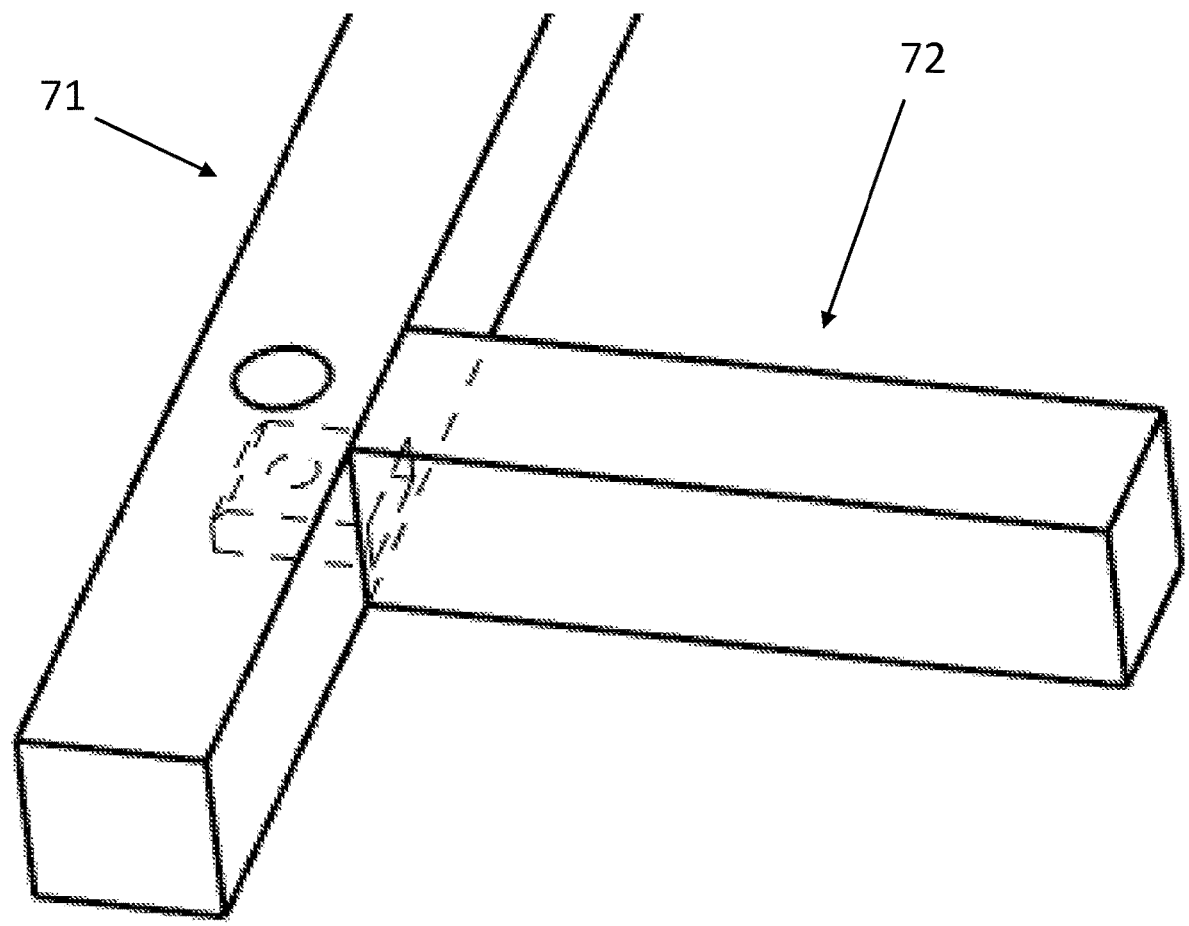
FIG. 25 is a perspective view of the joined male and female structural elements.

The present invention is a connector used to constrain two structural beams which have a mating interface that could be similar to that shown in FIG. 25. FIG. 25 is made up of two separate pieces 71 and 72. The female fitted structural element 71 is shown in more detail in FIG. 17 and FIG. 18. It can be seen that there is a cavity 54 which is adjacent to the female fitting 55, which is shown as a mortise. The cavity is shown as a counterbored hole 56 in FIG. 18, and it is where this connector is adhered. The male fitted structural element 72 is shown in more detail in FIG. 16. This male fitting has a lead edge with a chamfer 53 and a thru hole 52. When the male structural element is fully inserted into the female structural element, the hole in the male fitting should be nearly concentric with the minor diameter of the cavity within the female structural element. This connector, which will be described in different embodiments, will be adhered within this cavity.

Figure 1:
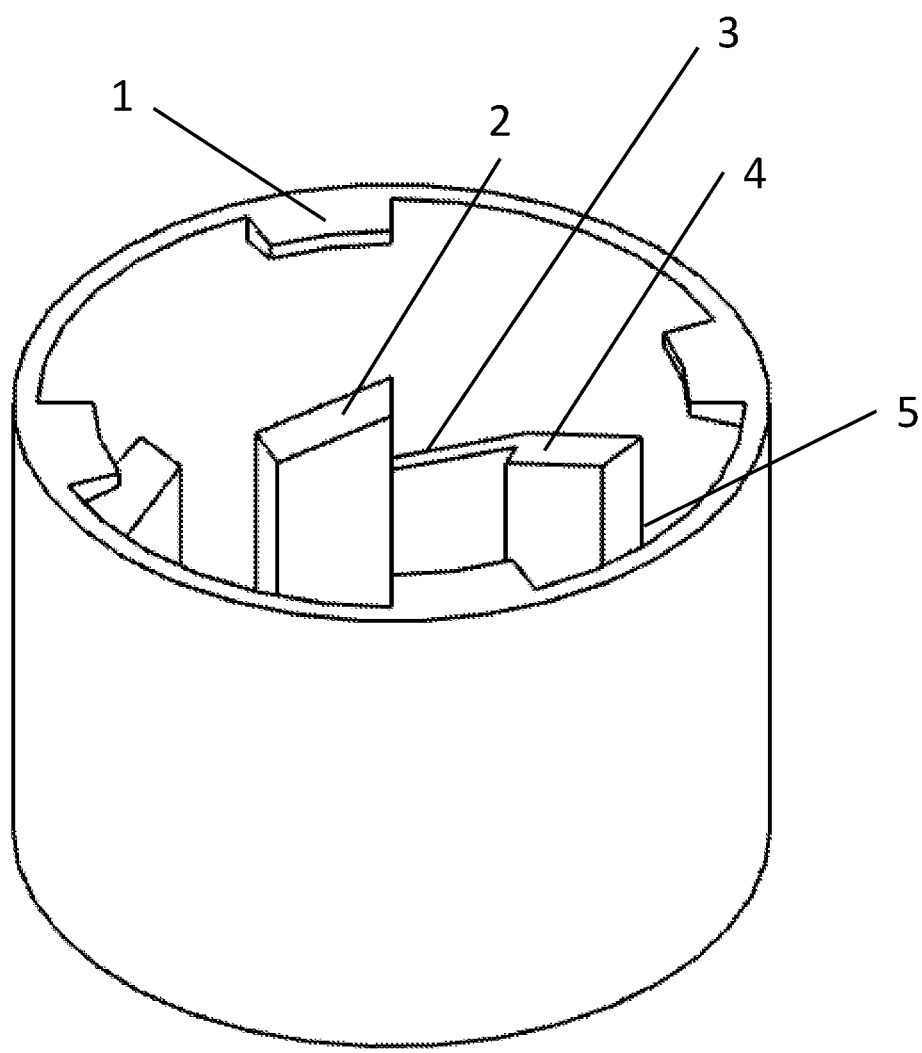
FIG. 1 is a perspective view of the static cam.
Figure 2:
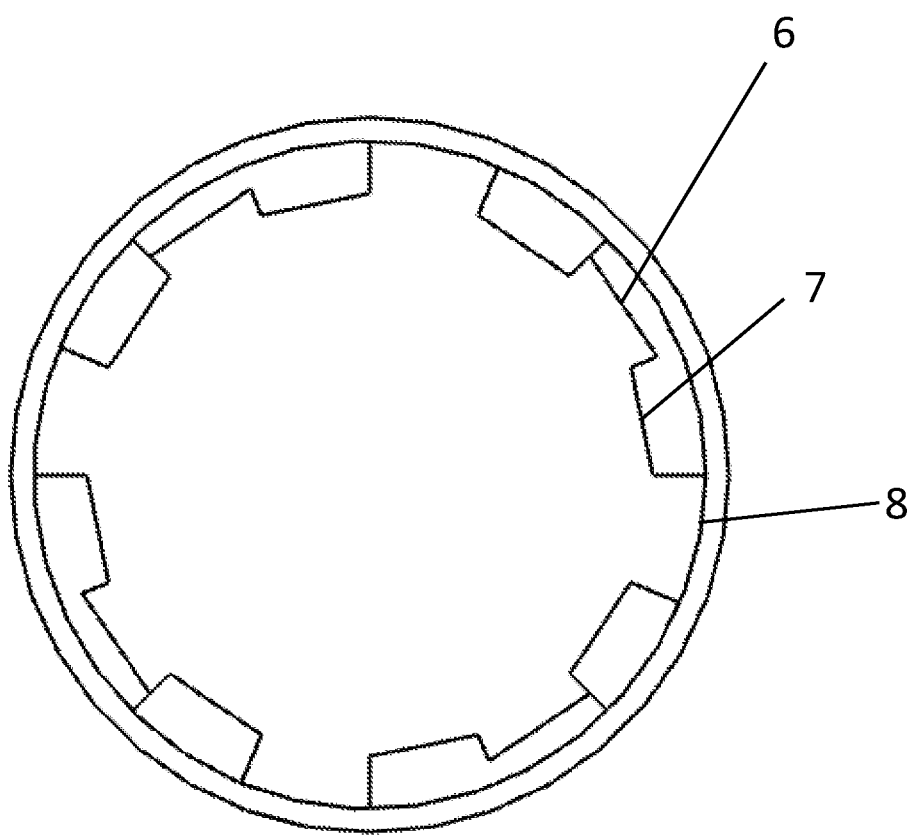
FIG. 2 is an overhead view of the static cam.
Figure 3:
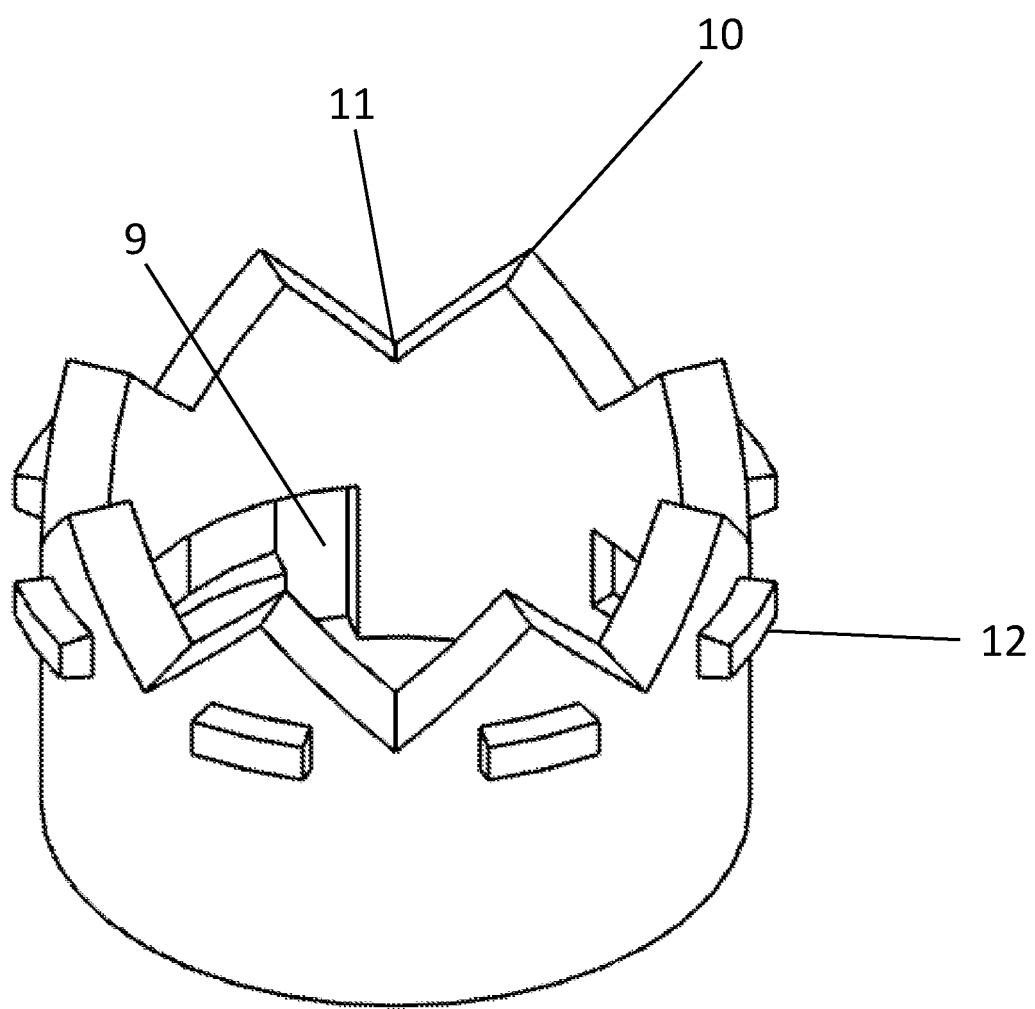
FIG. 3 is a perspective view of the vertical cam.
Figure 4:
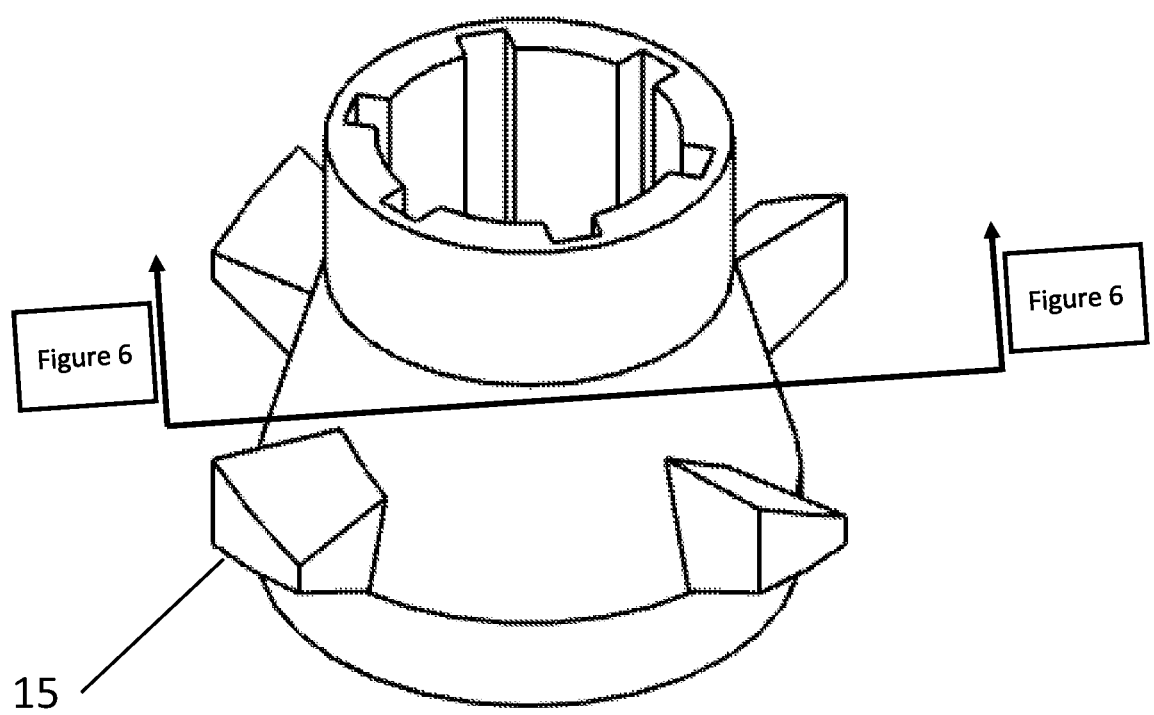
FIG. 4 is a perspective view of the twisting cam.
Figure 5:
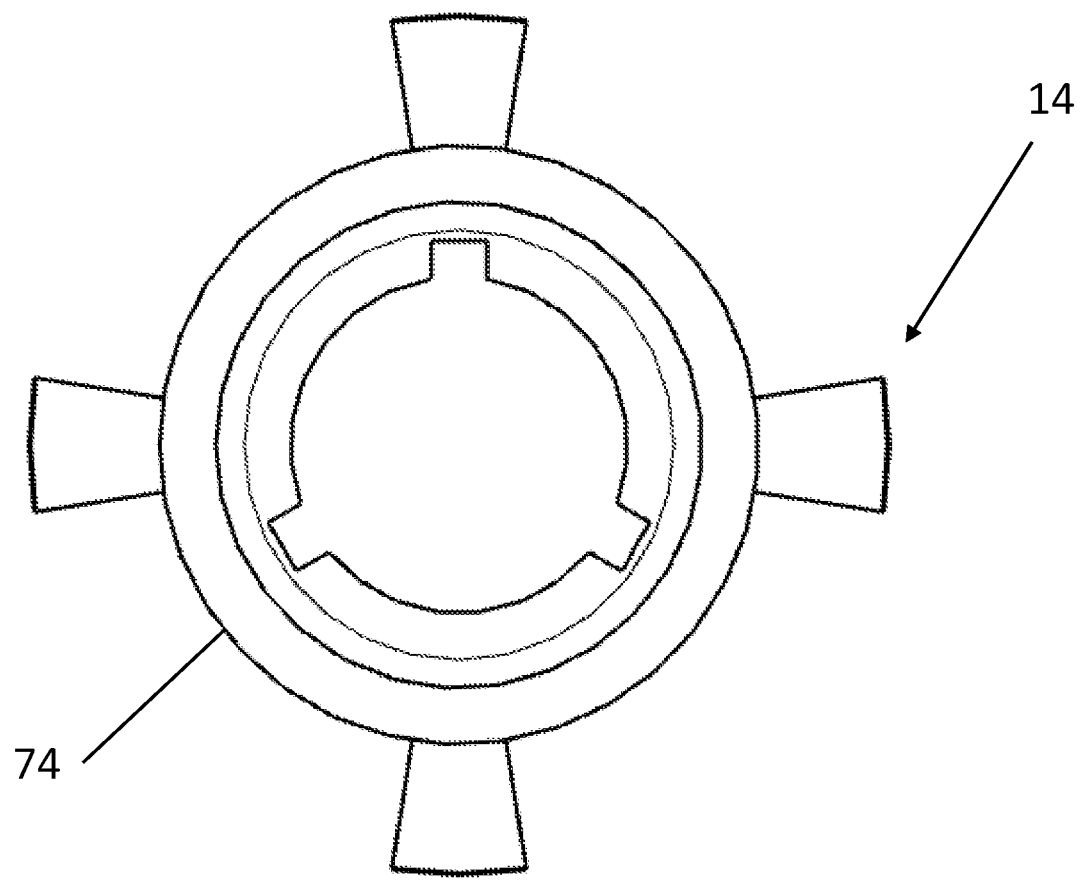
FIG. 5 is an overhead view of the twisting cam.
Figure 6:
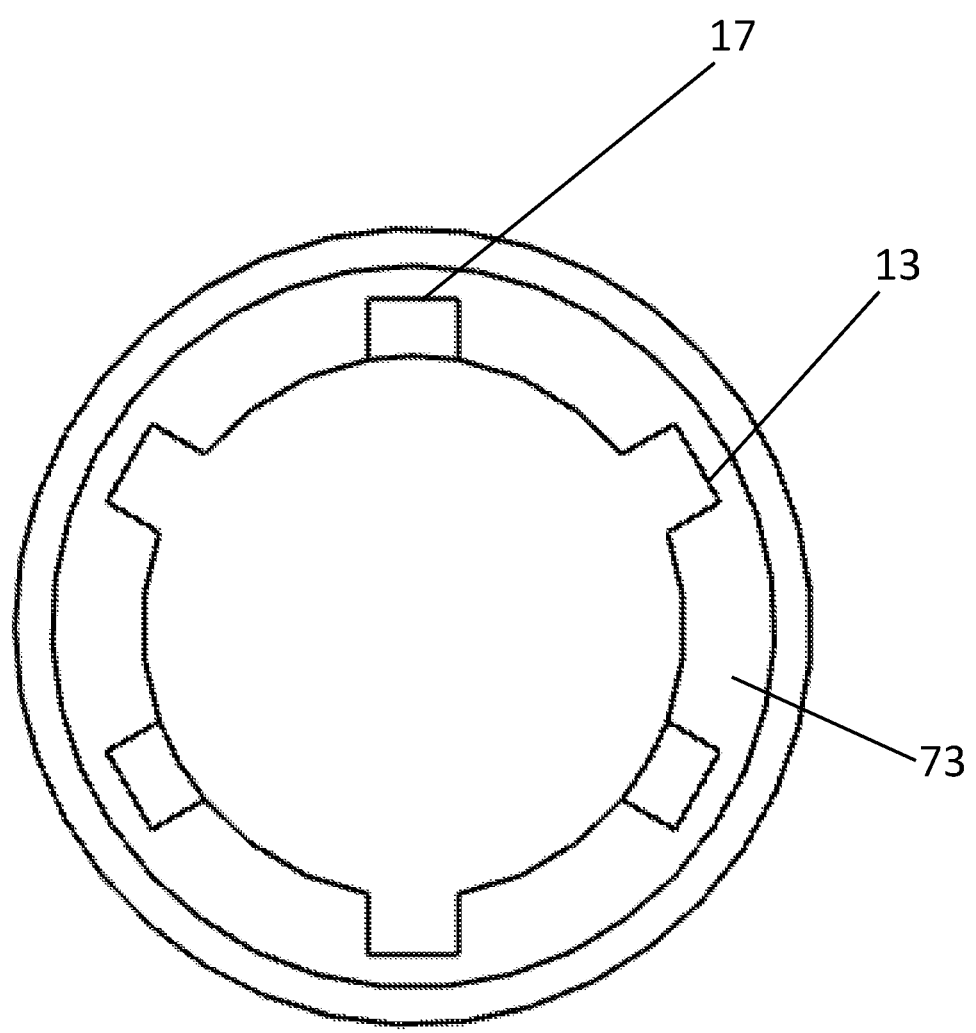
FIG. 6 is a cut-through of the twisting cam.
Figure 10:
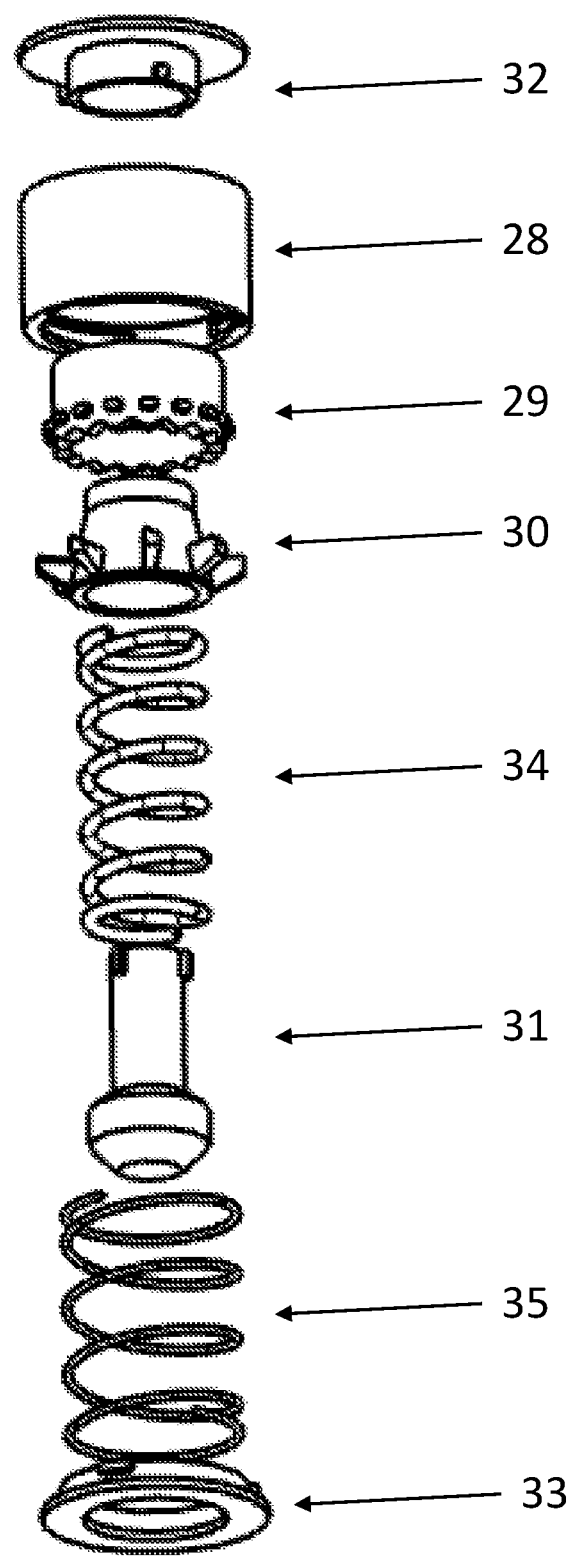
FIG. 10 is an exploded view of the rotating cam embodiment.

One embodiment for this invention is shown as an exploded view in FIG. 10. Starting with the static cam 28 which is also shown in FIG. 1. Within static cam, a vertical cam 29 is inserted and is shown in more detail in FIG. 3. Shown in FIG. 3 are eight alignment tabs 12 which mate with the eight vertical cam slots 6 & 8 in the static cam. Although eight tabs and support therefor are shown, any number of alignment tabs in the vertical cam can be used as long as the static cam mates properly and the vertical cam can slide vertically within the static cam.

It is important to note that the stable 11 and transition 12 points on the vertical cam are matched up in cycle with the alignment tabs on the vertical cam, i.e., the center of the transition point 10 has the same clocking position as the center of the alignment tabs 12. This ensures that the stable/transition points that interface with the twist cam tabs 14 rotate the twist cam 30 when it is supposed to be rotated.

After the vertical cam is inserted into the static cam, the twist cam 30 is inserted into the static cam as well. The static cam shown supports four rotating tabs 14 on the twist cam. There can be any number of rotating tabs on the twist cam, as long as the static cam is built to support the same number of twisting cams.

Figure 7:
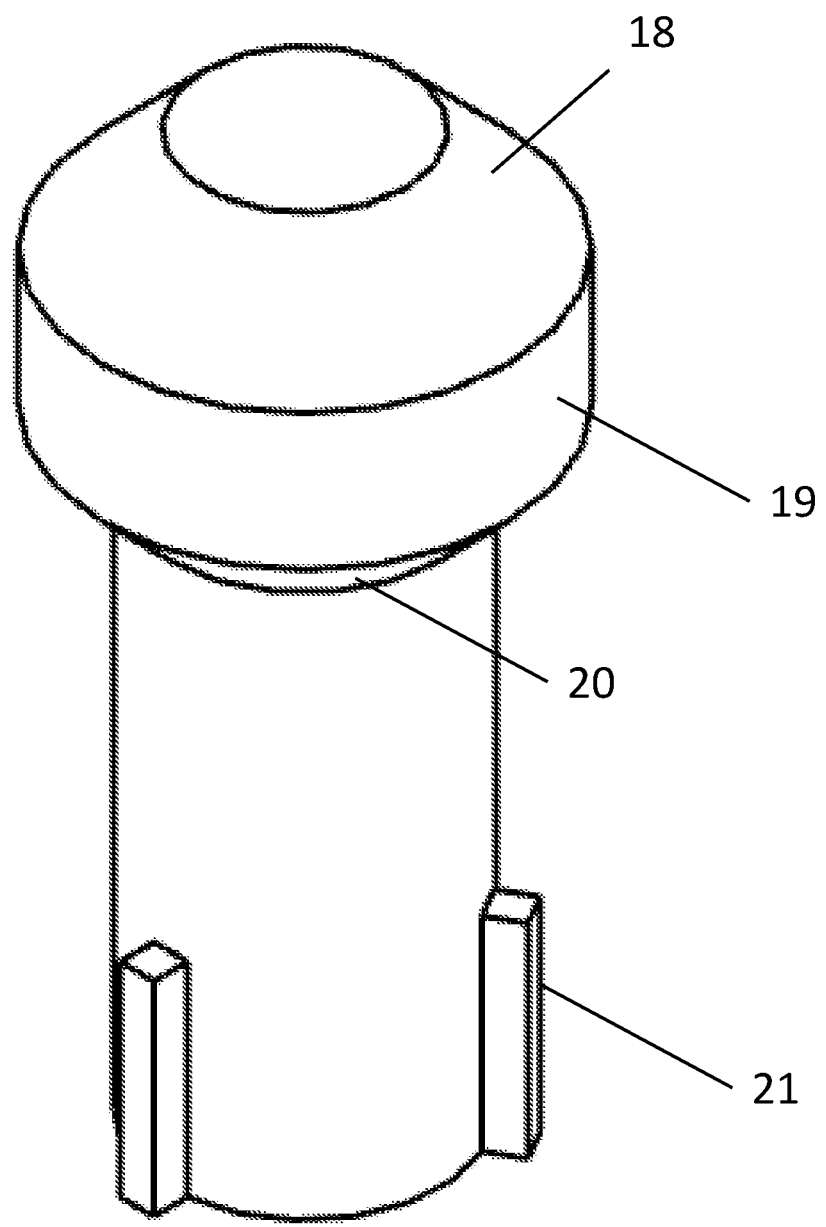
FIG. 7 is a perspective view of the center wedge.

A small spring 34 is then inserted into the twist cam. This spring has an outside diameter (OD) that is smaller than the inside diameter (ID) of the twist cam base. This spring also has a larger inner diameter than the outer diameter of the tabs 21 of the center wedge 31. The center wedge is shown in more detail in FIG. 7 and is now inserted into the twist cam after the small spring. One end of the small spring will rest on surface 73 of the twist cam and the other will rest on the lower chamfer 20 on the center wedge. The center wedge is then inserted into the twisting cam, and by doing so, the small spring is compressed. The center wedge is pushed all the way down so that the locking tabs 21 go through the thru slots in 13 which allow for the spring to be fully compressed. Once the locking tabs are all the way through the thru slots, the center wedge is rotated so that the alignment tabs now line up with the locking slots 17. The small spring is now trapped in a compressed position which pushes the center wedge all the way into the locking slots of the twist cam. It should be noted that although there are three locking slots/thru slots/alignment tabs illustrated, any number may be used as long as the pieces are able to mate properly.

Figure 9:
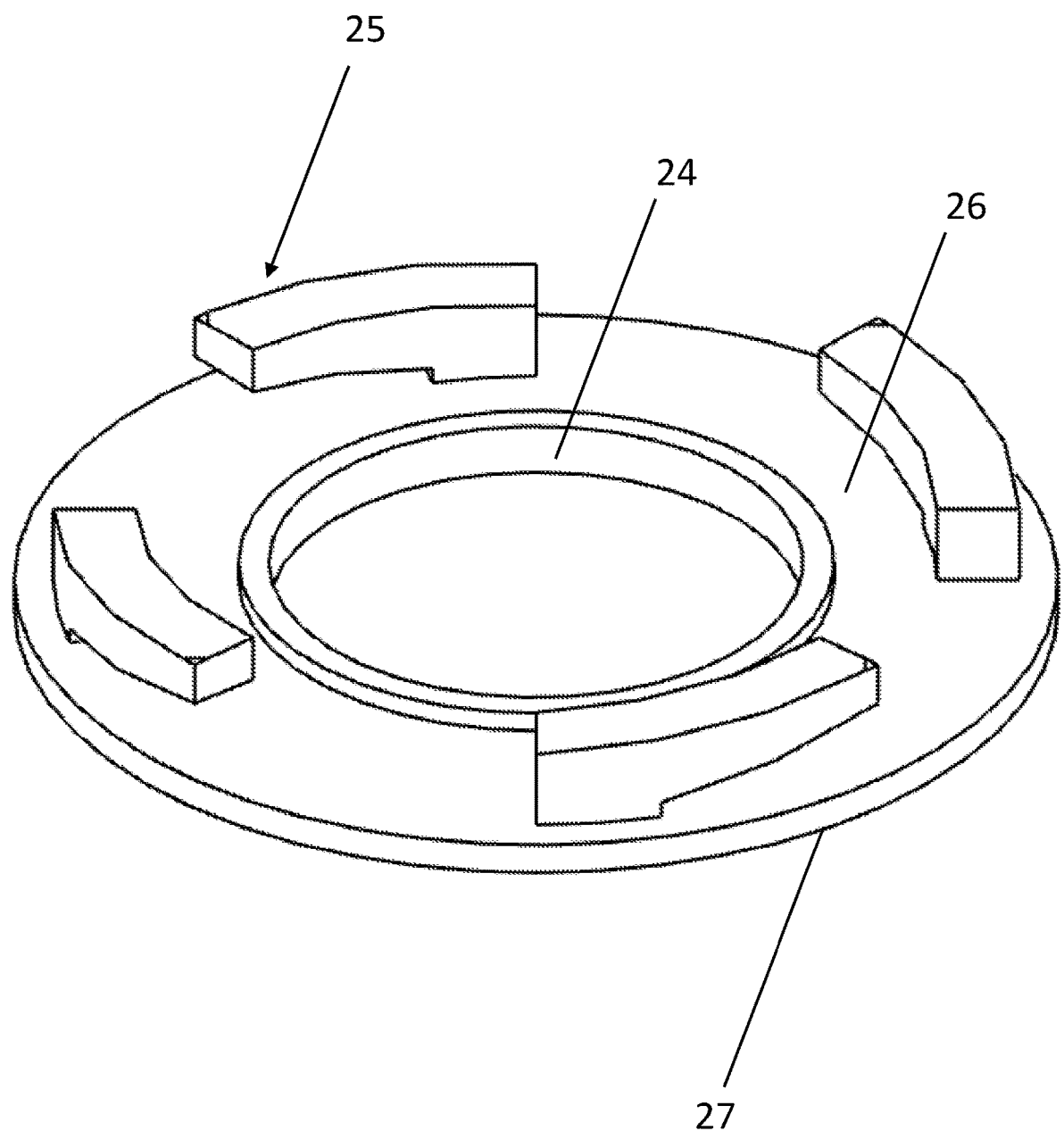
FIG. 9 is a perspective view of the bottom surface.

A large spring 35 is then inserted into a position to press on the back of the twist cam tabs 15. The bottom surface 33 is shown in more detail in FIG. 9. The bottom surface is rested on the free end of the large spring so that surface 26 is touching the free end of the large spring. In this specific embodiment, the large spring will have a smaller OD than the alignment tabs 7 of the static cam. The large spring will also have a larger ID than the base of the twisting cam 74. The bottom surface is then pressed down into the static cam and rotated to lock all the tabs 25 which mate with locking tabs 1 on the static cam. Although four tabs are shown in both FIG. 1 and FIG. 9, any number can be used but must be able to mate together. Shape, angle and locking direction (axial, radial, tangential, etc) of these tabs may also change, but the function remains the same.

Figure 8:
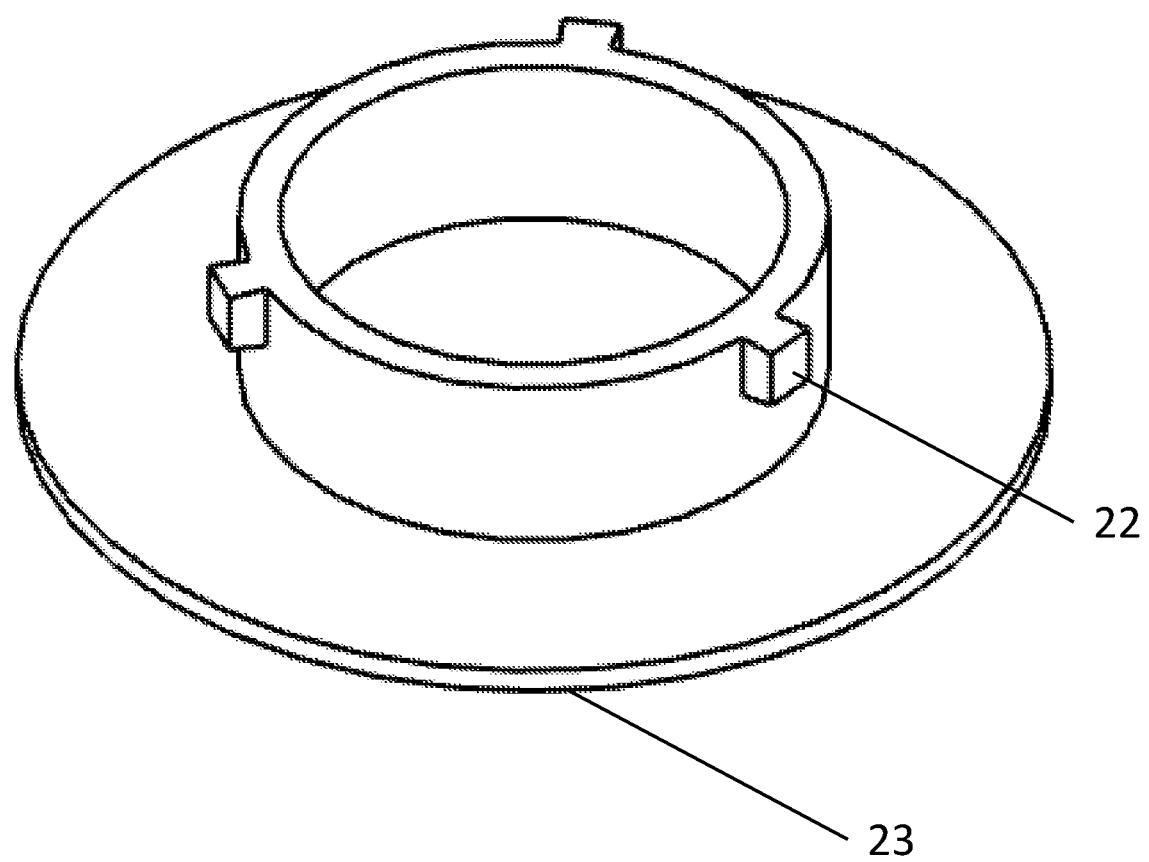
FIG. 8 is a perspective view of the top surface.

The whole assembly is then rotated 180° so that the top is new bottom, and top surface 32 is connected to the vertical cam. The top surface shown in FIG. 8 has three tabs 22 which mate with the locking slots on the vertical cam 9. The mating tabs on the top surface are inserted axially into the locking slots on the vertical cam and rotated until they are locked in place. Within the locking slot is preferably a tapered plane which will allow the top surface to have a tighter fit as it is turned. In this embodiment the top surface of the top surface 23 will function as the user interface.

Figure 17:
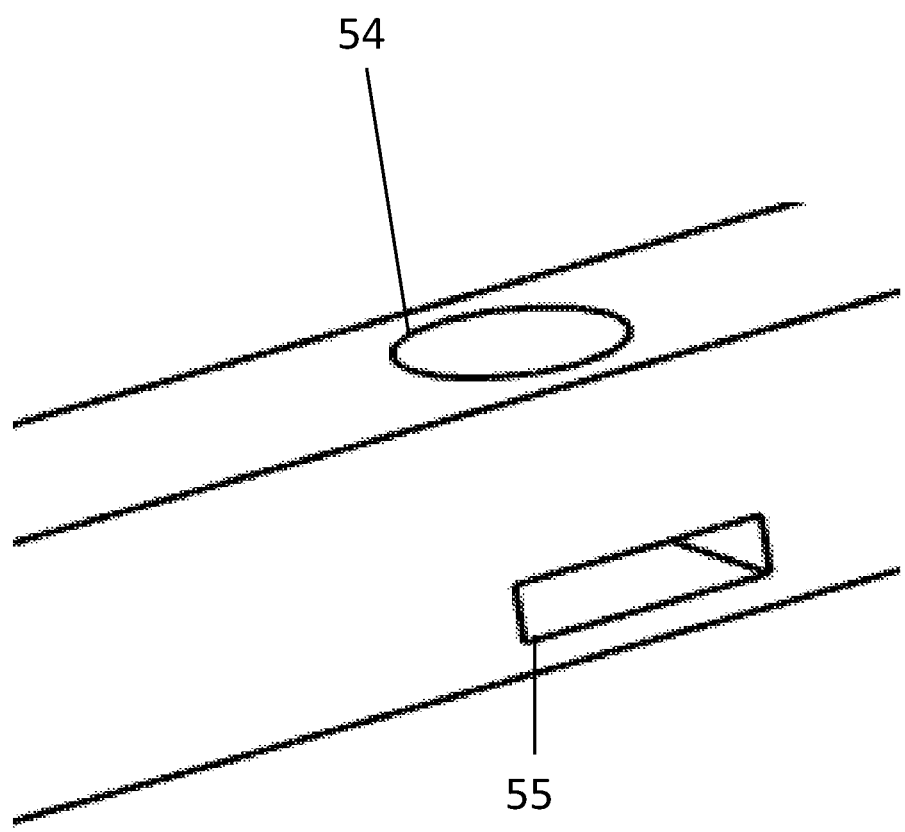
FIG. 17 is a perspective view of a structural element with a female fitting.
Figure 18:
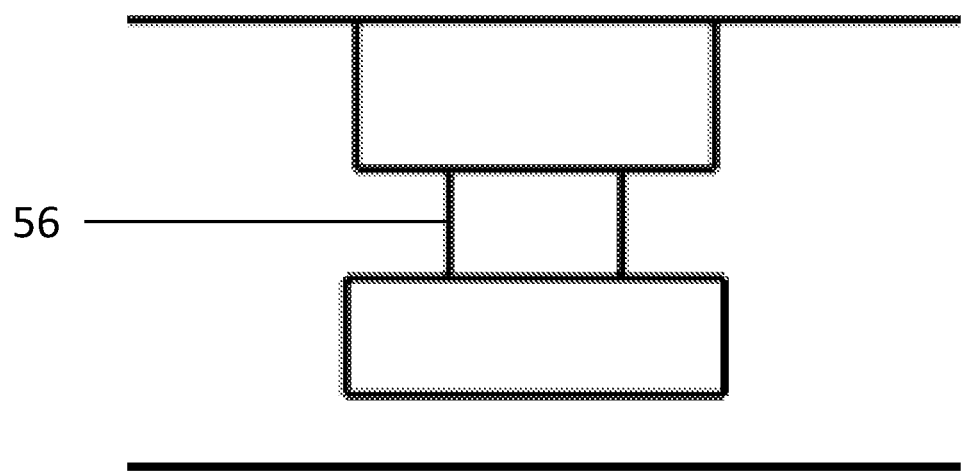
FIG. 18 is a front view of a structural element with a female fitting.

After this assembly is completed, it is inserted and secured within the connector cavity 54 within the female structural element seen in FIG. 17.

When the assembly is installed properly, the center wedge sticks slightly into the mortise when the twist cam is in its retracted position on the static cam. A bit of the edge chamfer 18 of this center wedge may extend into the mortise when the connector is retracted. When the assembly is 'clicked' to change position and the twist cam is rotated so that its tabs are in the engaged position, the locking surface 19 of the center wedge is extended into the mortise slot. This center wedge functions as the locking element in this embodiment.

If the male structural element is inserted into the female structural element when the connector is in the engaged position, the lead chamfer on the male fitting will push the edge chamfer of the center wedge out of the way. The center wedge will push back against the compression force of the small spring. This will remain as built up potential energy until the center hole of the tenon is co-axial with the center wedge. At this time the center wedge will translate into the tenon hole because of the potential energy built up in the small spring. The translation will stop when the alignment tabs on the center wedge bottom out on the locking slots in the twist cam. When the center wedge translates into the tenon hole, there is an audible "click" sound letting the user know it is locked in place.

The tenon now cannot be removed from the mortise without destroying the setup or toggling the user interface of the connector to switch the twist cam from the engaged position on the static cam to the retracted position. Once the connector has been toggled to the retracted position, only the edge chamfer will be within the mortise in the female structural element. With the connector toggled to the retracted position, the tenon can be retracted from the female structural element with minimal effort and without damaging anything.

Figure 14:
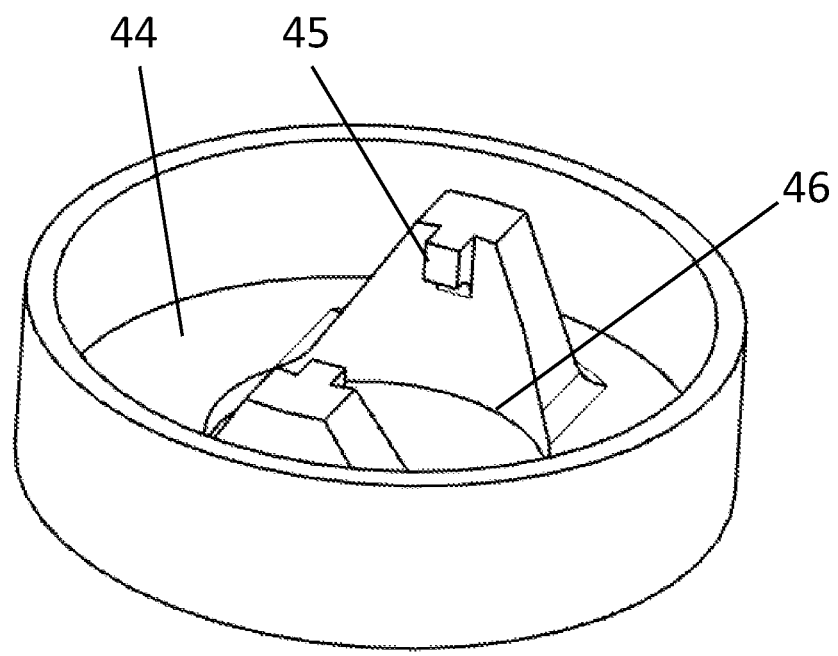
FIG. 14 is a perspective view of the alignment pin piece.
Figure 15:
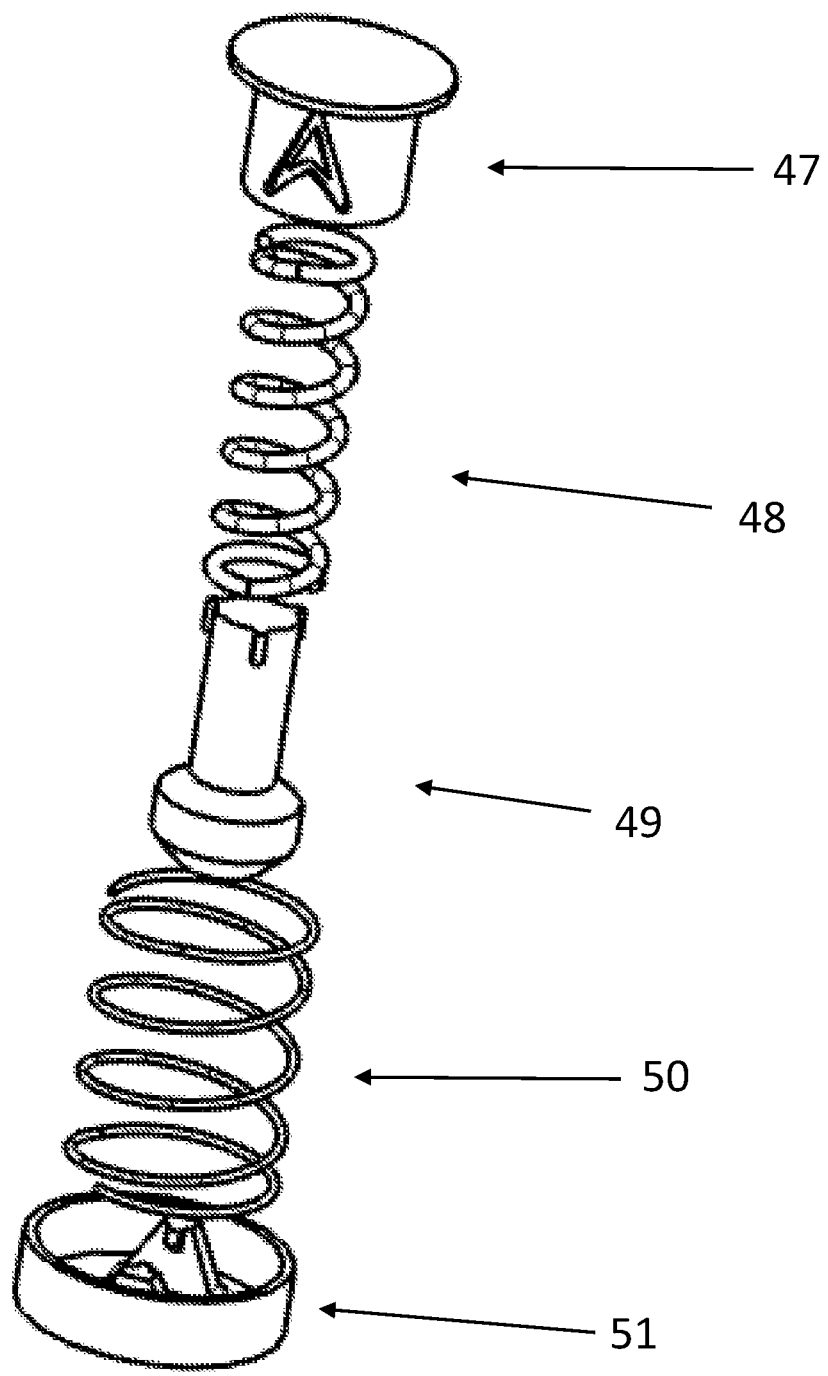
FIG. 15 is an exploded view of the of the groove-and-pin embodiment.

Another embodiment of the invention is the pin/groove arrangement which can be seen as an exploded view in FIG. 15. This embodiment interfaces with the same mortise/tenon structural element interface shown in FIG. 25. As with the rotating cam connector, the pin/groove connector will be secured within a cavity that is adjacent to the opening within the female structural element. A base piece 51 of this connector is shown in more detail in FIG. 14. The base piece has two tongs 45 but could have any number of them as long as it matches the number of tracks on the track piece 47. The tongs will have the same clocking position as their mating grooves on the track piece.

Within this base piece, a large spring 50 sits on surface 44. After the large spring has been inserted, the groove track piece will be inserted through the center of the base piece and the free end of the large spring will react with surface 40 on the groove track piece. It is important to make sure that when installing, the tongs all are in the same position along the track in the grooved piece. This should be obvious because if all the tongs are not in the same position along their respective track, the groove track piece will be sitting askew.

Figure 11:
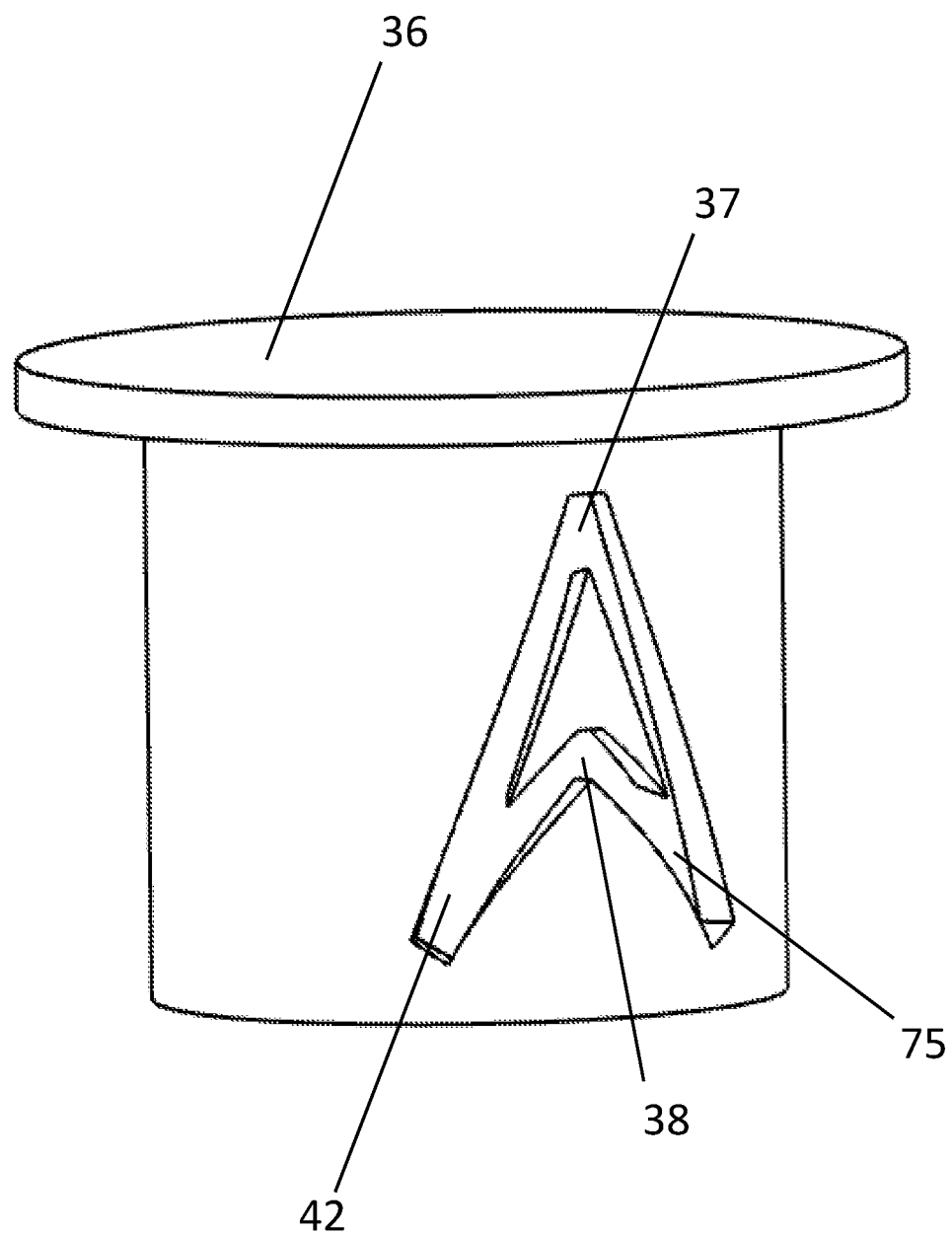
FIG. 11 is a perspective view of the grooved piece.
Figure 12:
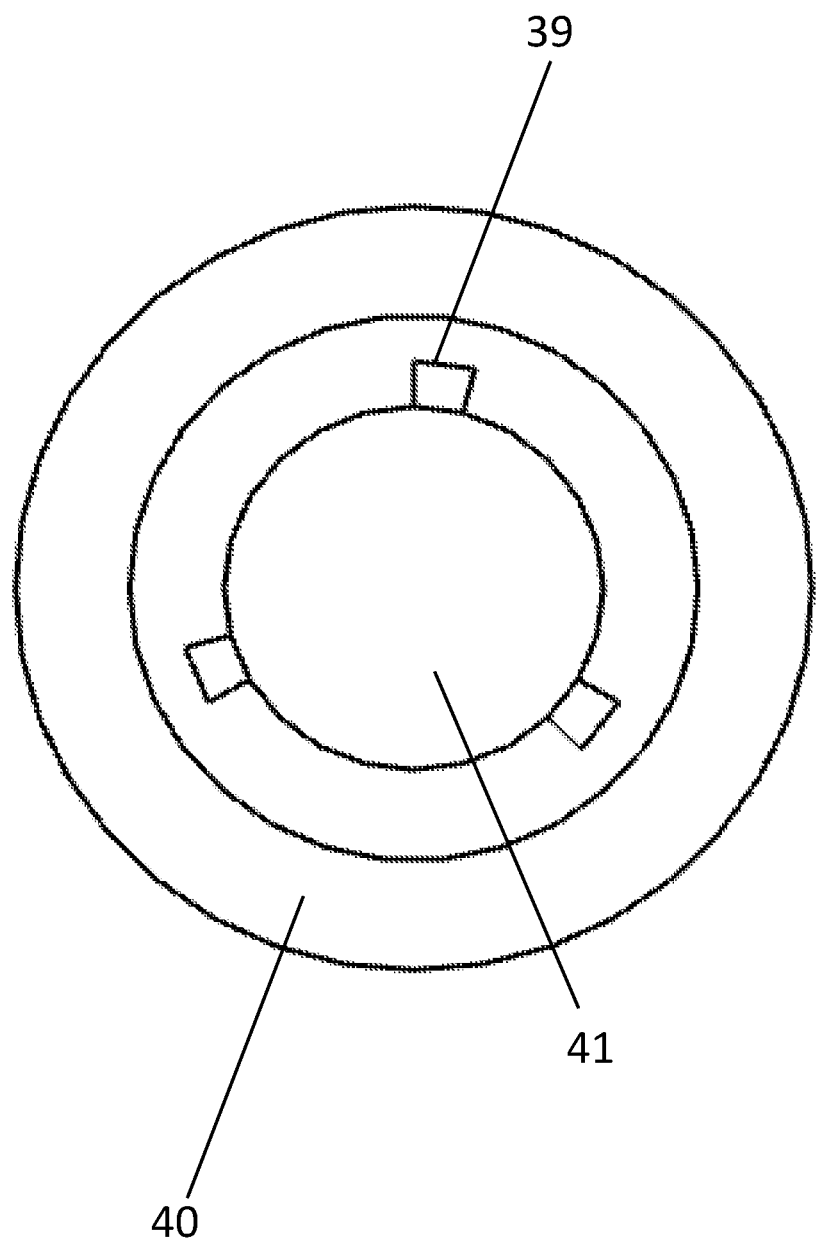
FIG. 12 is a bottom view of the grooved piece.
Figure 13:
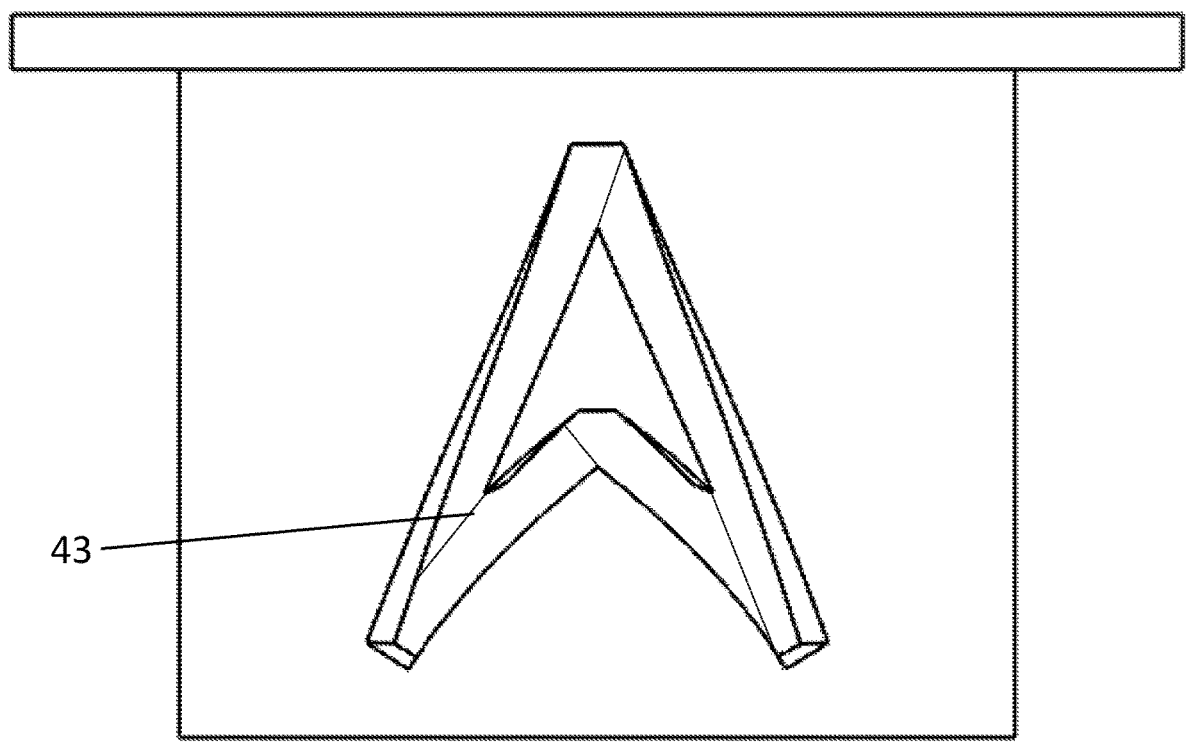
FIG. 13 is a front view of the grooved piece.

When installed properly, the tongs on the base piece will move along the groove track as the user toggles the connector between the engaged position 37 and the retracted position 38 on the grooved piece. The compressed large spring provides force which pushes the grooved piece towards the top of the paper in the orientation shown in FIG. 15. Along the grooved track seen in FIG. 11, there are, two stable positions, the engaged position 37 and the retracted position 38, as well as two transition positions 42 and 75. More detail of the grooved track can be seen in FIG. 13. There are four rapid transition lines 43 which are essentially drop-off points, or sudden changes from a large radius to a smaller radius along the groove track. The sections of the track between these transition lines, are tapered radially. This sudden change of radius allows the tong to move in only one direction along the track over these rapid transition lines, because the tong can move up a ramp but not up a cliff. By combining this varying radial tapering with the vertical force from the large spring, the predictable transition of this connector from its two stable stages (8B and 8C) is possible.

Although the grooved piece is pictured with a certain shape which is similar to a capital letter "A", the shape could vary as long as it has rapid transition lines so that there are at least two stable positions that are at different axial stations along the piece; it should have enough rapid transition lines so that there is predictable motion along the track. This track could be in any number of shapes i.e. two "J" or "L" shapes that are stamped adjacent to each other, a "W" shape, or any other shaped track that captures the above-mentioned design features.

This embodiment is partially assembled at this point, see FIG. 10, the large spring 50, the base piece 51 and grooved piece 47 have been installed together. The next step is to install the center wedge 49 and the small spring 48 within the current partial assembly. The center wedge will function as the locking element in this embodiment. Similarly to how the center wedge was installed in the rotating cam design, a small compression spring 48 is first installed around the base of the center wedge so that the end of the small spring is in contact with surface 20. This small spring must have a larger ID than the OD of the alignment tabs on the center wedge 21. The base of the center wedge is then inserted into the center of the grooved piece 41 with the alignment pins 21 following the alignment slots in the grooved piece 39. After it is fully inserted, the center wedge is rotated so that the alignment pins now fit inside of the locking slots of the grooved piece. Although the center wedge is pictured with three alignment pins, any number is acceptable, as long as it matches the number of alignment and locking slots in the grooved piece. This is the final step for assembling this embodiment and can now be adhered within the cavity of the female structural element.

Figure 22:
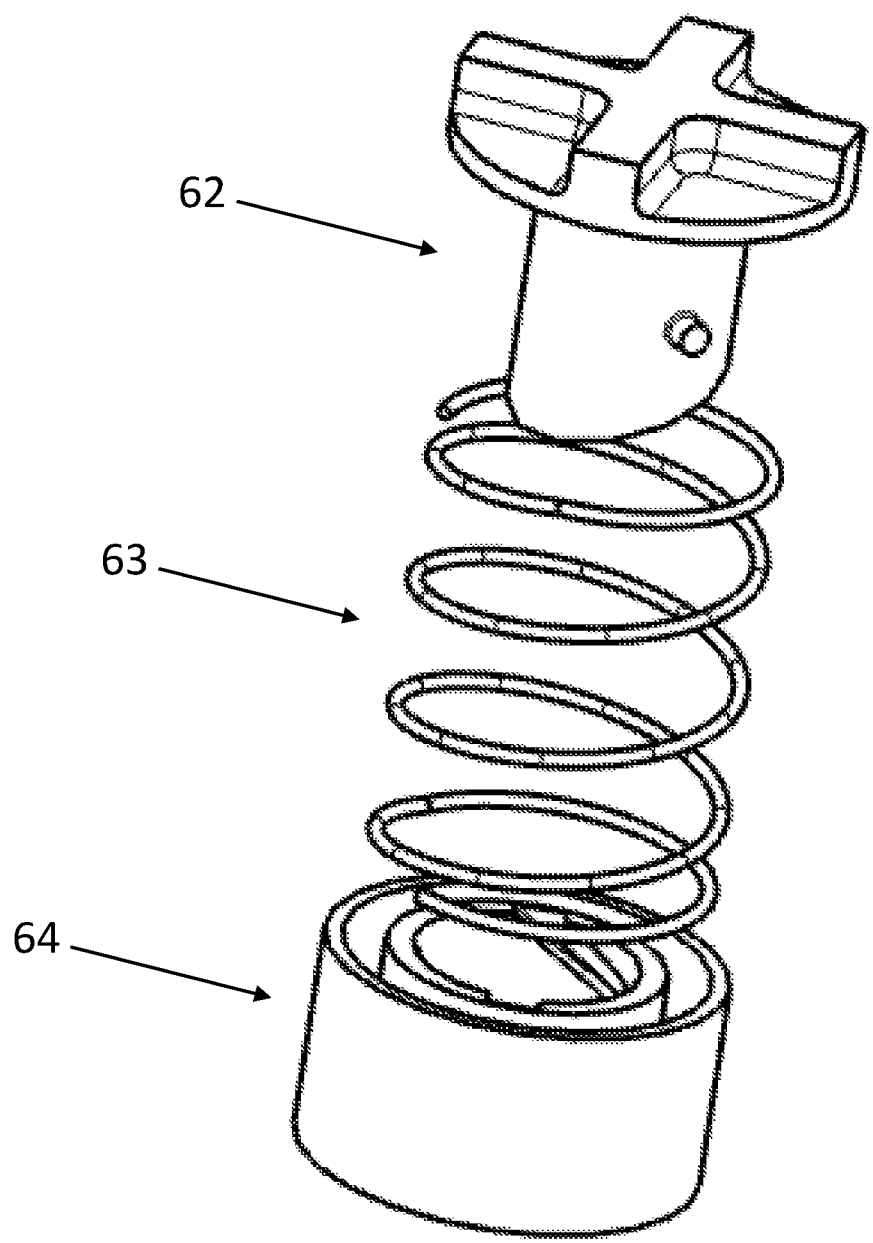
FIG. 22 is an exploded view of the quarter-turn embodiment.

A third embodiment utilizes a pin/groove arrangement (quarter-turn release assembly) and is shown in FIG. 22. The large spring 63 is placed within the base piece 64. Specifically the end of the large spring should be resting in the spring groove 60 of the base piece. Then the center piece is inserted into the center of the base piece such that the other end of the large spring is pressing against the underside of the user interface 76. Then to fully install the center piece in the base piece, the center's tabs 57 is inserted into the groove entrance 59 on the base piece. Then the user interface is twisted and compressed until the tab enters the main part of the groove 61 on the base piece.

Figure 19:
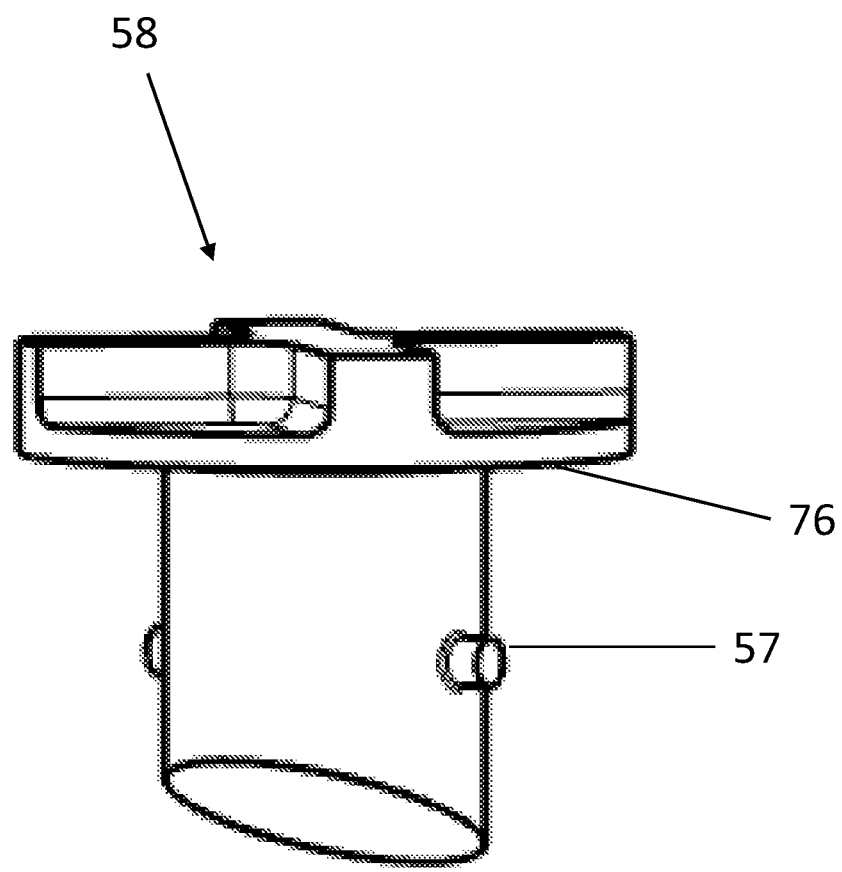
FIG. 19 is a perspective view of the center piece for quarter-turn embodiment.
Figure 20:
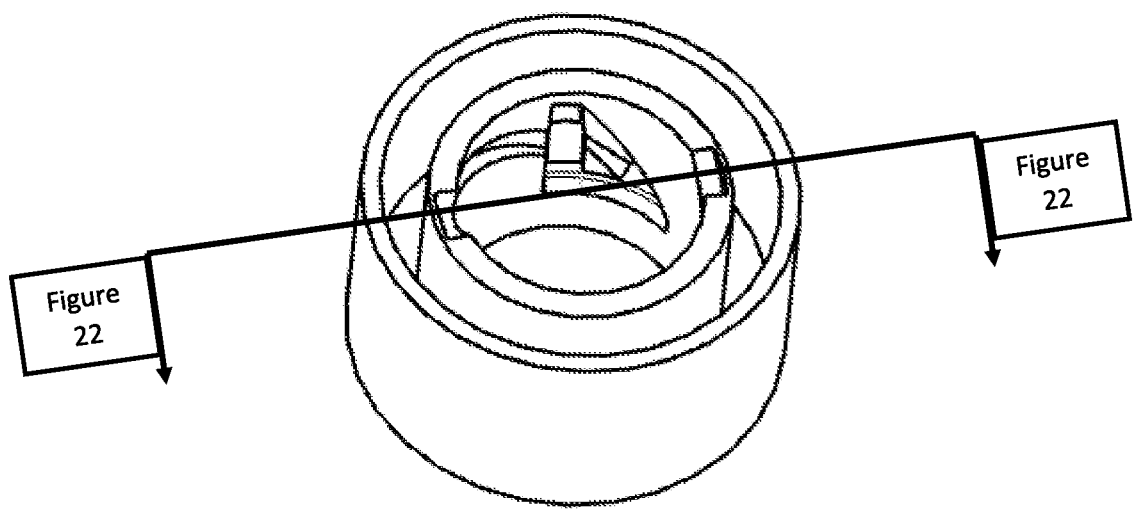
FIG. 20 is a perspective view of the base piece for the quarter-turn embodiment.
Figure 21:
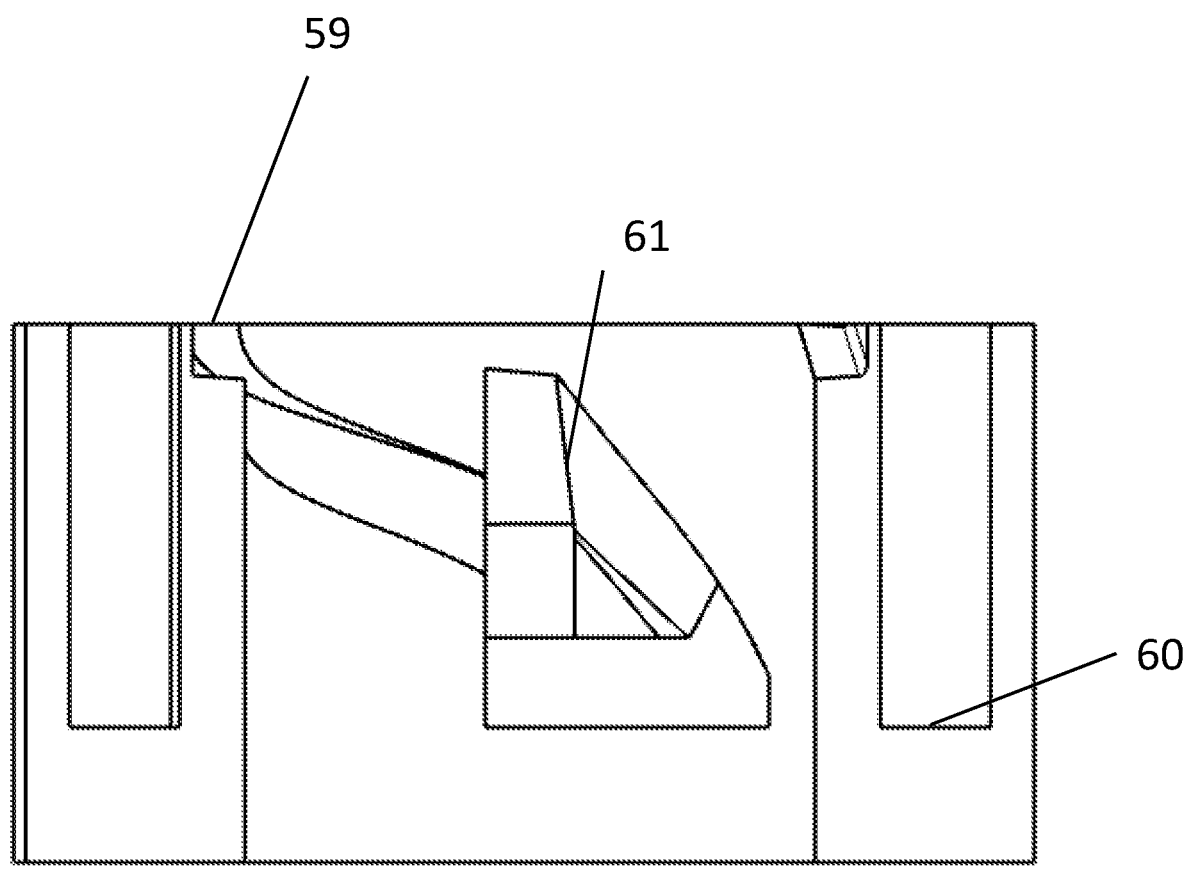
FIG. 21 is a cut-through view of the base piece for the quarter-turn embodiment.

A difference between this embodiment and the previous one is that to toggle this embodiment from the engaged to retracted position the top surface is not clicked, but rather it is twisted to toggle it. See FIG. 19, instead of a flat top surface there is a raised surface 58 which allows the user to apply torque. As with the previously described pin/groove embodiment, pin 57 is designed to mate with the grooved track 59 which has rapid transition lines 61 that allow for user control of whether the locking element is retracted or engaged. This connector can engage its locking element by clicking the top down which compresses the entire assembly and locks it in place. To release the locking element, the center piece 62 is rotated until the pin crosses the next rapid transition line. Then after the pin crosses this line, the large spring forces the pin up the grooved track back to the retracted position.

Figure 23:
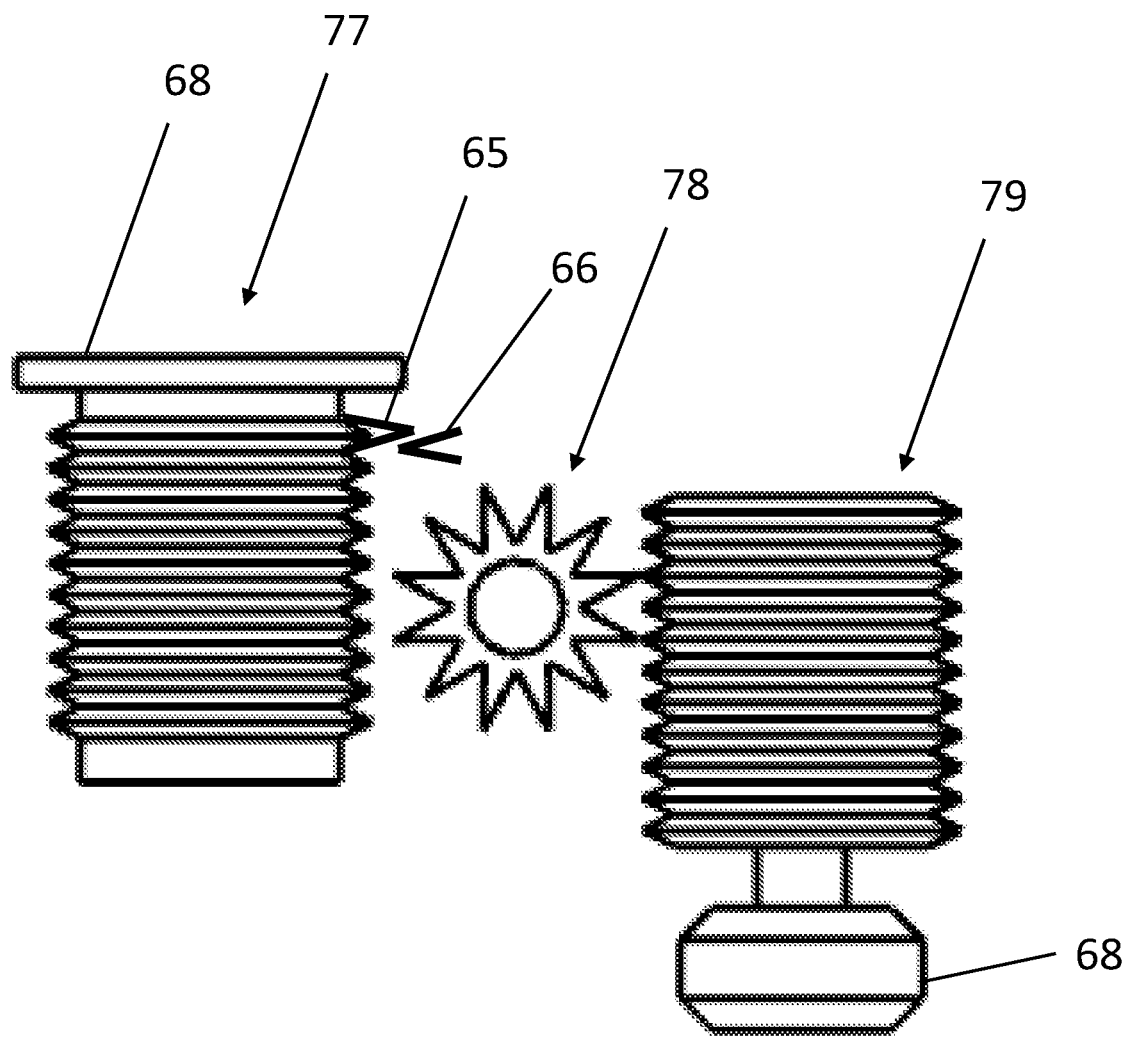
FIG. 23 is a side view of the geared-slider embodiment.
Figure 24:
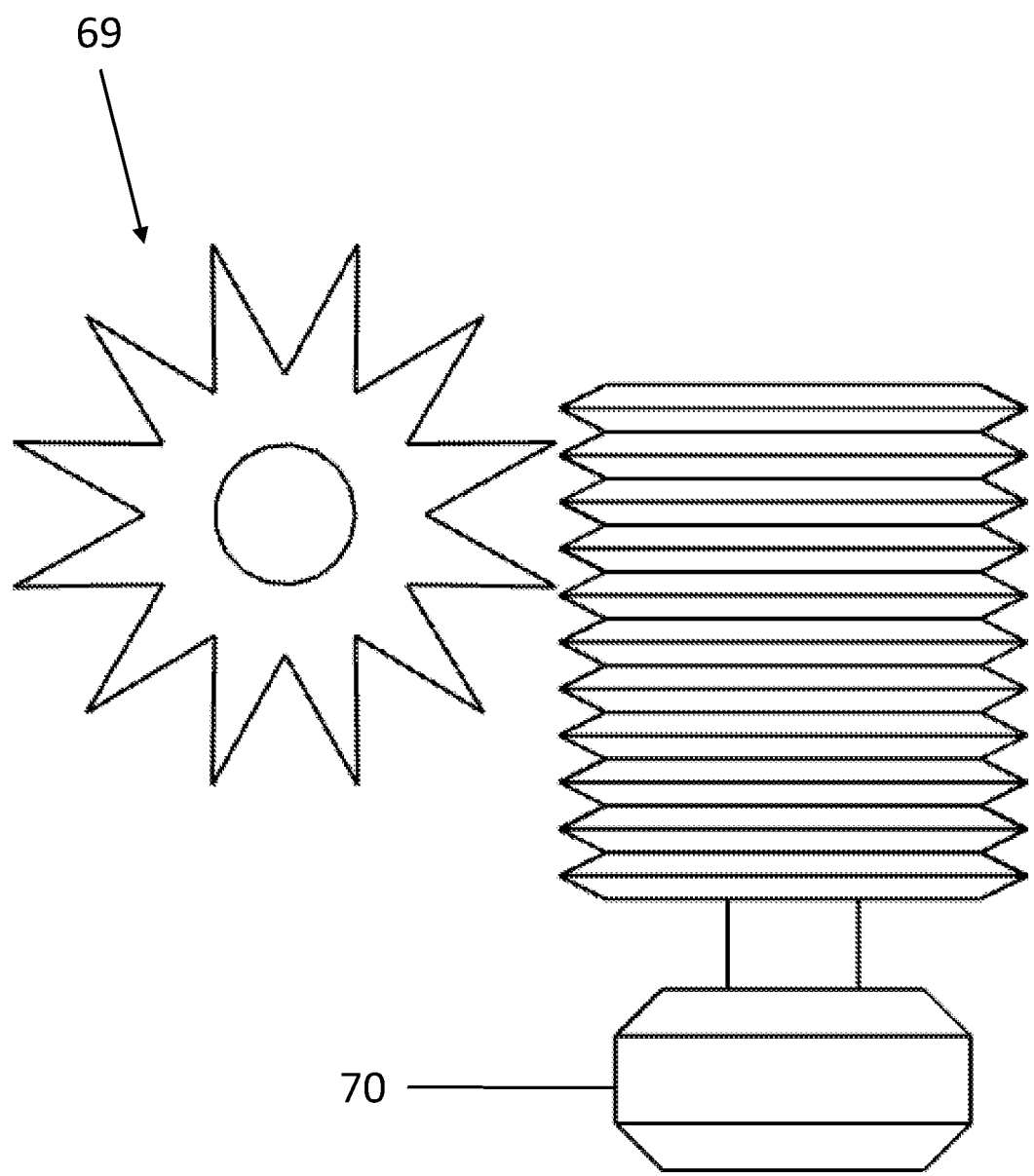
FIG. 24 is a side view of the thumb-wheel embodiment.

The fourth and fifth embodiments shown in FIGS. 23 and 24 are similar in that they both use geared elements to help toggle the locking element from a retracted to an engaged position. In the design shown in FIG. 24, a thumb wheel 69 is exposed outside the volume of the structural element 70 and comprises the user interface. By rotating this thumb wheel (17A) the locking element can be retracted or engaged.

The fifth embodiment, which utilizes geared elements, is shown in FIG. 23. This builds on the previous embodiment and adds an additional element of a flat user interface. In this arrangement the thumb wheel is not exposed to the user. Instead there is a ribbed cylinder 77 which engages with the hidden thumb wheel. Atop the ribbed cylinder is the top surface 68 which is the user interface. The user presses this surface down to either retract or engage the locking element, depending on the number of spur gears 78 used. A trapping element 66 can be added to a housing or as a static piece built into the female structural element. This trapping element latches with the tab 65 on the ribbed cylinder. To release the ribbed cylinder, the top surface is moved to the side away from the latch, freeing the assembly from the trapping element and toggling the locking element between engaged and retracted.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A locking structural elements, the locking assembly comprising:
   a female fitted structural element having a female fitting and a cavity;
   a male fitted structural element having a male fitting, wherein the male fitting further comprises a through hole and a chamfered lead edge;
   wherein when the male fitted structural element is fully inserted into the female fitted structural element, the through hole of the male fitted structural element is nearly concentric with a minor diameter of the cavity of the female fitted structural element;
   a connector mounted within the cavity of the female fitted structural element comprising:
      a top surface,
      a bottom surface,
      a first spring located between the top surface and bottom surface,
      a second spring, smaller in diameter than the first spring, located between the first spring and the top surface,
      a center wedge located between the first spring and the second spring, wherein the center wedge comprises:
         a cylindrical portion that includes locking tabs,
         an upper portion that includes a lower chamfer, a locking surface, and a rounder top surface;
      wherein the bottom surface has an opening to receive the locking surface of the center wedge;
   wherein the connector is capable of being toggled from a locked position, in which the center wedge extends into the through hole of the male fitting, to an unlocked position, in which the center wedge is retracted within the cavity of the female fitting, and vice versa using a button-press motion.

2. The locking device of claim 1, wherein the top surface further includes tabs.

3. The locking assembly of claim 2, wherein the locking assembly further comprises a static cam wherein the static cam further includes locking tabs and vertical cam slots and wherein the static cam is located below the top surface and above the second spring.

4. The locking assembly of claim 3, wherein the locking assembly further comprises a vertical cam wherein the vertical cam has alignment tabs that are capable of mating with the vertical cam slots of the static cam and wherein the vertical cam further includes transition points and stable points that match up in cycle with the alignment tabes such that the center of the transition point has the same clocking position as the center of the alignment tabs and wherein the vertical cam is located below the static cam and above the second spring.

5. The locking assembly of claim 4, wherein the locking assembly further comprises a twist cam wherein the twist cam further includes twist cam tabs and wherein the twist cam is located below the vertical cam and above the second spring.

6. The locking assembly of claim 5, wherein tabs of the top surface are capable of being engaged with the locking slots of the vertical cam and are capable of being rotated to a locked position and wherein the top surface is capable of compressing the static cam down and over the vertical cam and the vertical cam is capable of compressing down and over the twist cam and the twist cam is capable of compressing the second spring, the center wedge, and the first spring such that the locking surface of the center wedge is compressed through the opening in the base surface thereby locking the connector.

7. The locking assembly of claim 1, wherein the top surface further includes a grooved track piece having a transition point, a retracted piece, two transition positions, and an engaged position.

8. The locking assembly of claim 7, wherein the bottom surface further includes a tong that is capable of moving along the grooved track piece between the engaged position and the retracted position such that when the tong is in the engaged position with the grooved track piece, the first and second springs will be compressed, thereby compressing the locking surface of the central wedge through the opening in the base surface thereby locking the connector.

9. A locking assembly connecting two or more modular structural elements, the locking assembly comprising:
a female fitted structural element having a female fitting and a cavity;
a male fitted structural element having a male fitting, wherein the male fitting further comprises a through hole and a chamfered lead edge;
wherein when the male fitted structural element is fully inserted into the female fitted structural element, the through hole of the male fitted structural element is nearly concentric with a minor diameter of the cavity of the female fitted structural element;
a connector mounted within the cavity of the female fitted structural element comprising:
a top surface including a center piece, user interface, tabs, and a raised surface,
a bottom surface including an opening to receive the center piece, a groove entrance, a spring groove, and rapid transition lines; and
a first spring located between the top surface and bottom surface;
wherein an end of the first spring rests in the spring groove of the bottom surface and an opposite end of the first spring is pressed against an underside of the user interface; and
wherein the user interface is inserted into the groove entrance of the bottom surface and is configured to be twisted such that the tabs of the top surface enter the groove entrance by way of the rapid transition lines of the bottom surface such that the center piece is compressed through the base surface thereby locking the connector;
wherein the connector is capable of being toggled from a locked position, in which the center wedge extends into the through hole of the male fitting, to an unlocked position, in which the center wedge is retracted within the cavity of the female fitting, and vice versa using a button-press motion.

* * * * *